United States Patent [19]

MacBean

[11] 4,035,872
[45] July 19, 1977

[54] METHOD OF CLOSING FABRIC SEAMS

[75] Inventor: Donald George MacBean, Pierrefonds, Canada

[73] Assignee: JWI Ltd., Montreal, Canada

[21] Appl. No.: 646,977

[22] Filed: Jan. 6, 1976

[30] Foreign Application Priority Data

Jan. 7, 1975 United Kingdom .............. 00514/75

[51] Int. Cl.$^2$ .......................... F16G 3/00; F16G 7/01
[52] U.S. Cl. .................................... 24/31 H
[58] Field of Search ................. 24/31 H, 31 V, 31 W, 24/33 P, 33 K; 74/231 J; 254/52

[56] References Cited

U.S. PATENT DOCUMENTS

| | | | |
|---|---|---|---|
| 358,944 | 3/1887 | Scott | 74/231 J X |
| 1,841,303 | 1/1932 | Simpson | 24/31 H |
| 1,852,732 | 4/1932 | Bong | 24/31 V |
| 3,309,790 | 3/1967 | MacBean | 24/33 K |
| 3,574,898 | 4/1971 | Scott | 24/32 |
| 3,581,348 | 6/1971 | Lister | 24/31 H |

*Primary Examiner*—Philip Kannan
*Assistant Examiner*—D. Griffin
*Attorney, Agent, or Firm*—Alan Swabey & Co.

[57] ABSTRACT

The respective ends of a heavy fabric, for example, a woven dryer fabric or felt each provided with an array of connectong loops are joined with the help of a gap closing device. The gap closing device is detachably attached to the fabric when the latter is supplied to the user. When the fabric is being installed on the machine, the ends are pulled together by the gap closing device so that the arrays of loops are held in proximity and easily intermeshed to form an elongated tubular passage. A pintle wire is inserted into the passage to complete the joint. The gap closing device is then removed. A preferred gap closing device is a slide fastener, of which one tape is detachably attached to each end of the heavy fabric.

11 Claims, 3 Drawing Figures

METHOD OF CLOSING FABRIC SEAMS

BACKGROUND OF THE INVENTION

1. Field of Invention

This invention relates to closing seams in joining the ends of wide heavy fabrics whose edges are provided with complementary arrays of separable intermeshing loops.

It is specially applicable to joining the ends of woven synthetic dryer fabrics or felts, as used in the dryer section of paper making machines and will be described specifically in this context. These fabrics are usually woven of natural or synthetic fibers bulked or layered to produce a heavy woven structure which can be for example from about 1/32 to about ⅛ of a inch thick. They are supplied in various widths from about 5 feet to about 30 feet depending on the width of the paper machine, and in length from about 40 feet to about 350 feet.

Some dryer fabrics may be woven endless. However, with fabrics more than 120 feet or so in length, endless weaving is not practical. It is more common to weave the felt as a long wide flat single piece and then join the ends to make and endless belt. The ends and each provided with an array of clipper-type loops or with an array of loops of either plastic or metal sewn in or otherwise attached. In making the joints, the ends of the cloth are forced together so that the array of loops of one end is intermeshed with the array of loops of the other. All the loops are thus brought into register so that they form an elongated tubular passage into and through which a hinge pin or pintle wire is inserted to form a hinge-type joint.

The structure of the dryer felt makes it relatively pliable in the machine direction and relatively rigid in the cross machine direction. Because the felt is heavy, wide and unwieldy and there is tension on it as is installed on the machine it is hard to pull the two ends of the fabric together and hold their respective arrays of loops in accurate register while the pintle wire is inserted. Considerable force and dexterity is required. The problem is specially difficult with wide heavy felt.

In the course of aligning and intermeshing the loops, once a start has been made at one side of the felt, it is generally quite easy to start inserting the pintle wire. However, once the pintle wire has been inserted for a certain distance, say three or four feet, such resistance is encountered that further insertion becomes difficult or impossible. The weight of the two ends of the fabric tends to force them apart and the strain on the fabric, inpulling the ends together distorts the loops making perfect alignment difficult. At the same time, the loops through which the wire has already been inserted are pulled against it and the resulting friction resists its further insertion.

2. Description of Prior Art

Various ways have been tried to make it easier to inset the pintle wire. One way has been to rotate it as it is being inserted, for example, with an electric drill. Another is first to insert a relatively small diameter pilot wire of hard tempered steel and then use the pilot wire to pull the larger more flexible pintle wire through the socket. Still another way, if the wire is of a structure that may be pushed through the loops without too much friction or distortion, is simply to provide it with a point. Another rather crude method is to bring the ends of the fabric together intermeshing their loops and temporarily nailing the ends to a board until the pintle wire has been inserted. This is only effective with narrow dryer felts and, in any case, tends to damage the cloth.

All these methods are awkward, and, since they are time consuming, they result in considerable down time while the entire machine is shut down for installation of the dryer felt.

SUMMARY OF THE INVENTION

Having regard to the foregoing, an object of the present invention is to provide means for joining the ends of wide heavy fabrics provided with complementary arrays of separable intermeshed loops and more particularly means contributing to the easy installation of dryer felts.

This is accomplished, according to the invention, by using a detachable gap closing means for engaging the respective free ends of a wide heavy fabric whose respective edges are equipped with arrays of loops and drawing the ends together so that the arrays of loops are in close proximity and can be readily brought into register to form a tubular passage for the pintle wire. The ends are thus held by the gap closing means, against forces tending to pull them apart, until the pintle wire is inserted to complete the joint. Once the pintle wire is inserted, the gap closing means is detached.

Preferably the gap closing means is of a type having one member detachably attached to each free end and in which the respective members have means for progressively engaging each other widthwise of the fabric. One such device is a slide fastener having a pair of tapes whose edges are equipped with interlocking elements and a slider which interlocks the elements as it is moved from initial coupling links at one end towards the other end. One tape is detachably attached to the marginal part of one free end of the belt. The other tape is similarly attached to the other free end, desirably, as in the case of a dryer felt through the medium of a flap, permanently connected to the other free end.

When the belt is installed at the mill the ends are pulled together and the slide fastener meshed and closed so that the free edges are drawn together. Then, the loops may be manually pushed into register so as to form the passage for the pintle wire.

Usually the ends of the fabric are equipped with the gap closing means when the fabric is manufactured. The closure is effected when the belt is installed in the mill and the gap closing device employed at that time. After the pintle wire has been inserted through the loops at the end of the fabric the gap closing device is detached from the fabric and may be returned to the manufacturer for re-use.

One way of detachably attaching the slide fastener tapes is by a bag or chain stitch through the tapes and ends of the fabric which stitch is of a type which can be readily pulled out once the joint has been made. Another way is by providing the surface of the slide fastener tapes with a suitable pressure-sensitive adhesive which sticks the tapes to the fabric of the ends sufficiently to retain the slide fastener in place so that it serves its purpose, but which will allow the tape to be peeled from the fabric once the joint is completed. Another example of a type of closure member which can be used is one in which an elongated male member which is snapper into and elongated female member, for instance, as a bead into a groove.

BRIEF DESCRIPTION OF THE DRAWINGS

The invention will be further described by reference to the accompanying drawings, illustrating a preferred embodiment, and in which.

DESCRIPTION OF PREFERRED EMBODIMENT

Figure 1:
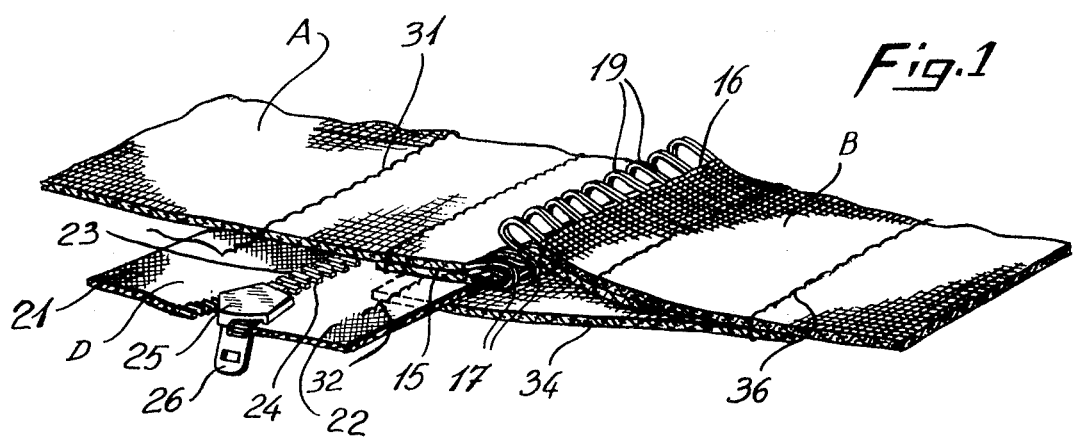
FIG. 1 is a fragmentary cross-sectional perspective view showing respective ends of a dryer felt in a first stage of being joined.

Referring more particularly to the drawings, A and B are the respective ends of a dryer felt being brought together ready for joining in accordance with the preferred embodiment of the invention illustrated. The dryer felt is a woven fabric having the following characteristics.

The end edge 15 of the end A is provided with an array of spaced apart loops or eyes 17. The end edge 16 of the end B is provided with an array of spaced apart loops 19. The spacing between the respective loops in the arrays 17 and 19 is desirably sufficient for a loop of one array to fit easily in the space between two loops in the other array. When the edges of the ends A and B are brought together and the arrays of loops are in register, the aligned loops when intermeshed form an elongated tubular passage for receiving a pintle wire C.

In accordance with the preferred form of invention shown the edges of the respective ends A and B are drawn together so as to bring their respective arrays 17 and 19 into register, by a temporary connecting and joining member, which in the preferred form shown is a slide fastener D having respective tapes 21 and 22 having proximate edges provided with intermeshing elements 23 and 24 respectively and a slider 25 for meshing or unmeshing the elements 23 and 24. The fastener D is provided with a manipulating tab 26. The fastener is also provided with the usual socket and pin elements (not shown) which are coupled so as to connect the ends of the respective sides of the fastener together initially.

The tape 21 is sewn with a bag or chain stitch 31 to the underside of the end A. The other tape 22 is sewn with a bag or chain stitch 32 to a fabric flap 34 which, in turn, is permanently sewn as at 36 to the underside of the end B. It is desirable to have the flap 23 attached to the forward running side of the joint so that, the in operation, it will underlie and give protection to the loops and stitches of the clipper seam.

The tapes 21 and 22 are positioned in respect of the ends A and B so that when the fastener is closed by sliding the slide along the elements to draw them together and to mesh them, the prepared loops, or clipper seam loops, 17 and 19 of the respective arrays are readily intermeshed in alignment across the width of the dryer felt.

The invention makes use of the ease with which a slide fastener is closed, even against the considerable tension of the belt tending to keep the ends A and B apart.

Figure 2:
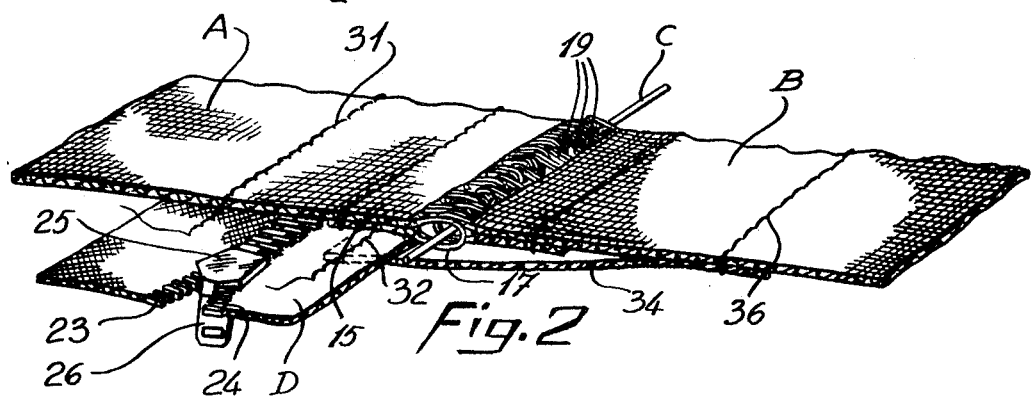
FIG. 2 is a similar fragmentary view of the ends of FIG. 1 in a further stage of being joined.
Figure 3:
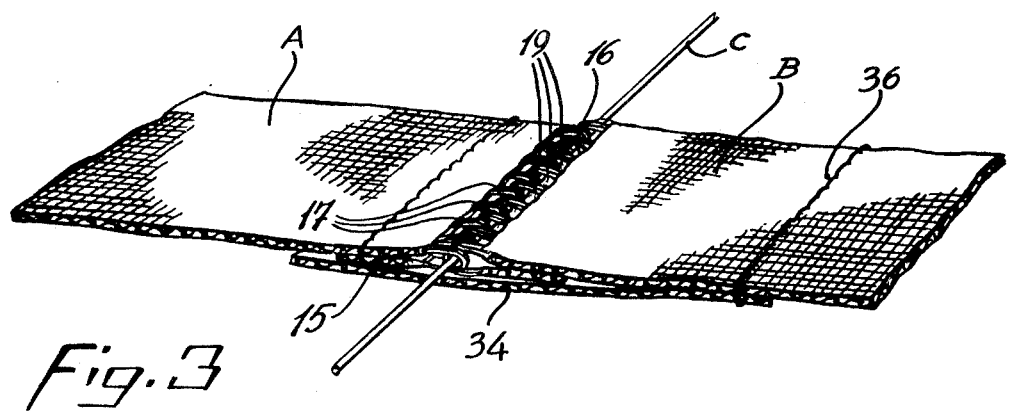
FIG. 3 is a view similar to FIGS. 1 and 2 showing the finished joint.

In the operation of joining the ends of the felt, the felt is installed on the machine and the ends brought into rough proximity in the usual way, and then the ends of the slide fastener are engaged and the slider slid along the elements to draw the tapes 21 and 22 together, and with them the margins 15 and 16 of the ends A and B. The arrays of loops 17 and 19 are drawn together easily and intermeshed in exact alignment to provide the tubular passage for the pintle wire. The slide fastener absorbs the tension exerted by the weight of the felt so that there is no tendency for the loops to be distorted or disengaged. The pintle wire P may then be inserted (as shown in FIG. 2) without loss of time.

Once the pintle wire is in place to hold the clipper seam together in a hinge-like joint, the fastener D may be removed simply by pulling out the bag or chain stitches on each side. These stitches are such that they come out merely by grasping a free end and pulling. If desired, the stitches can be of a distinguishing color so as to be readily located.

While this specification has been directed to the seaming of dryer felts in particular, it should be understood that the teachings of the present invention are applicable to other types of papermaker's clothing as well, including for example, Fourdrinier type fabrics, press felts or to facilitate the installation of fabric covers to be shrunk on filter drums.

The dryer belt is used for supporting and draining a formed web of paper during the paper making process. Its characteristics and manner of use will be well understood by one skilled in the art. It must have sufficient strength to perform as a dry belt and a smooth surface so as not to mark the surface of the web being formed. It should be permeable enough to allow easy transmission of water vapor and resilient enough to recover quickly from repeated nip pressures over long periods of time. Belts in the press section usually have a batt of non-woven fibers needled into one or both sides of a woven supporting or core fabric. This provides for high drainage capacity. The supporting fabric is usually woven of a synthetic material, for example a polyester. The type of material and weave may vary. Such fabrics are quite flexible in the machine direction and relatively stiff in the cross machine direction. The belts run about several rolls, more or less, depending on their specific use. The dryer felt is threaded through a series of steam-heated dryer rolls in quite a complicated pattern, with the fabric going over one roll down around another and up on top of another and so on. Another type of belt is the Fourdrinier type used for drying pulp. This is a fairly coarse mesh fabric having good drainage capacity. Its surface characteristics are not so important because it carries a large was of pulp say three inches thick which is being formed into a sheet for ease of transportation as compared with logs. In all cases the belts are unwieldy making it difficult to bring their ends together and hold them in position to bring the loops into register.

The connecting loops may be made of synthetic material or wire. They may be sewn in, or, if the clipper type, may be clipped on. In the drawings each loop is shown made up of a pair of strands. Actually, where the loops are formed across the edge of the fabric they can be a continuous series of loops and they can be clipped out at intervals to form the ncessary gap to receive the loops of the other edge. The provision of a flap is common. The flap may be of any suitable fabric. Sometimes available short lengths of fabric discarded from manufacturing other articles are employed.

An alternative way of attaching the fastener tape is to provide the tape and fabric end to which it is to be attached respectively with a multiplicity of complementary interlocking hook and eye members as for example with "Velcro" (trade mark) fabric. In this case the tape is engaged merely by pressing it in place so that the hook and eye members interlock and can be removed merely by peeling off the tape.

I claim:

1. In a method of drawing together into juxtaposition the ends of a wide heavy fabric, against resistance of said ends to being drawn together, each end being provided with an array of loops spaced apart in the lateral direction of the fabric and adapted to be intermeshed and brought into register to form an elongated tubular passage for receiving an elongated holding member to form a hinge-type joint, comprising the step of, connecting a side of a gap closing device detachably laterally along each of the respective ends with complementary progressive fastening means of the device on each side extending from one edge to the other ready to be engaged to draw the ends of the heavy fabric together in increments and thereafter retaining the increments together in a relative holding position.

2. A method of joining the respective ends of wide heavy fabric, each provided with an array of loops spaced apart in the lateral direction of the fabric and adapted to be intermeshed and brought into register to form an elongated tubular passage for receiving an elongated holding member to form a hinge-type joint, comprising the steps of, detachably connecting a respective side of a gap closing device laterally along each of the respective ends with complementary progressive fastening means of the device on each side extending from one side edge of the fabric to the other to be engaged to draw the ends of the heavy fabric together and thereafter retaining the increments together in a relative holding position, actuating the device to close the gap and to bring the respective arrays progressively into proximity and so to retain them, intermeshing the loops of the respective arrays, inserting an elongated member into the tubular passage formed by the loops, and removing the gap closing device from the fabric.

3. A wide heavy fabric having respective ends to be pulled together and their edges joined to form an endless band, the edge of each of said ends being provided with an array of loops spaced apart in the lateral direction of the fabric and adapted to be intermeshed with the array of the other edge to form an elongated tubular passage for receiving a pintle to complete a hinge-type joint, the improvement in which, one side of a gap closing device having respective interlocking means is attached to each of said ends for drawing the respective ends together progressively starting at one side edge of the fabric in continuous increments and thereafter retaining the increments together in a relative holding position from which the loops of the respective arrays can be readily intermeshed manually to form said elongted passage.

4. A wide heavy fabric having respective linear ends to be pulled together and joined, each of said ends being provided with an array of loops spaced apart in the lateral direction of the fabric and adapted to be intermeshed and brought into register with the array of the other end to form an elongated tubular passage for receiving an elongated member to complete a hingetype joint, the improvement comprising, one end of the fabric having a flap connected to it in a position to underlie the joint, one side of progressive gap closing means being attached to said flap and the other side of said gap closing means being attached directly to the other end of the fabric whereby the respective ends may be drawn together to pull the respective arrays of loops into a position to be readily intermeshed to form said elongated passage.

5. A wide heavy fabric having respective linear ends to be pulled together and joined, each of said ends being provided with an array of loops spaced apart in the lateral direction of the fabric and adapted to be intermeshed and brought into register with the array of the other end to form an elongated tubular passage for receiving an elongated member to complete a hinge-type joint, the improvement comprising, one side of a slide fastener having a plurality of fastener elements being attached to one end and the other side of said slide fastener having a plurality of complementary fastener elements adapted to interlock with the fastener elements on the one side being attached to the other end whereby the respective ends may be drawn together to pull the respective arrays of loops into a position to be readily intermeshed to form said elongated passage, a socket on one side and a pin on the other for initially connecting the sides, and a slider for drawing the complementary elements progressively together.

6. A wide heavy fabric, as defined in claim 3, in which the gap closing device is a slide fastener having a plurality of fastener element on one side adapted to interlock with a plurality of complementary fastener elements on the other side.

7. A wide heavy fabric, as defined in claim 4, in which the gap closing means is a slide fastener having a plurality of fastener elements on one side adapted to interlock with a plurality of complementary fastener elements on the other side, a socket on one side and a pin on the other for initially connecting the sides, and a slider for drawing the complementary elements progressively together.

8. A wide heavy fabric, as defined in claim 3, in which the gap closing device is a fastener having an elongted groove on one side and an elongated rib on the other side adapted to mate with said groove.

9. A wide heavy fabric, as defined in claim 7, in which the sides of the slide fastener have tapes temporarily attached to the flap and end margin of the fabric respectively by a bag or chain stitch.

10. A wide heavy fabric, as defineed in claim 5, in which the sides of the slide fastener have tapes temporarily attached to the flap and end margin of the fabric respectively by a bag or chain stitch.

11. A wide heavy fabric, as defined in claim 5, in which the sides of the slide fastener have tapes detachably attached to the parts of the fabric by adhesive.

* * * * *

UNITED STATES PATENT AND TRADEMARK OFFICE
CERTIFICATE OF CORRECTION

PATENT NO. : 4,035,872
DATED : July 19, 1977
INVENTOR(S) : Donald George MacBean It is certified that error appears in the above-identified patent and that said Letters Patent are hereby corrected as shown below:

In the "Abstract", line 3, change "connectong" to -connecting-.

Col. 1, line 24, change "and"(2nd occurence) to -are-.
      line 57, change "inset" to -insert-.

Col. 2, line 67, change "snapper" to -snapped-.

Col. 4, line 48, change "was" to -wad-.

Claim 1, line 2, change "againt" to -against-.

Claim 3, line 18(last line), change "elongted" to -elongated-.

Claim 8, line 2, change "elongted" to -elongated-.

Claim 10, line 1, change "defineed" to --defined--.

Signed and Sealed this

Seventh Day of February 1978

[SEAL]

Attest:

RUTH C. MASON
*Attesting Officer*

LUTRELLE F. PARKER
*Acting Commissioner of Patents and Trademarks*